United States Patent [19]

Halle et al.

[11] 4,216,294

[45] Aug. 5, 1980

[54] UNSATURATED POLYESTER RESIN FOAMS AND METHODS OF PREPARATION

[75] Inventors: Reidar Halle, Novato; Ronald L. Pastorino, Larkspur, both of Calif.

[73] Assignee: Argus Chemical Corporation, Brooklyn, N.Y.

[21] Appl. No.: 910,259

[22] Filed: May 30, 1978

[51] Int. Cl.$^2$ .............................................. C08J 9/02
[52] U.S. Cl. ...................................... 521/99; 521/110; 521/122; 521/137; 521/138
[58] Field of Search ................... 521/99, 110, 122, 137

[56] References Cited

U.S. PATENT DOCUMENTS

| | | | |
|---|---|---|---|
| 2,529,512 | 11/1950 | Ott ................................................ | 521/99 |
| 2,634,244 | 4/1953 | Simon ........................................... | 521/99 |
| 2,740,743 | 4/1956 | Pace .............................................. | 521/99 |
| 3,173,897 | 3/1965 | Adams et al. ................................ | 521/99 |
| 3,591,532 | 7/1971 | Abercrombie et al. ..................... | 521/99 |
| 3,823,099 | 7/1974 | Doyle ............................................ | 521/99 |

*Primary Examiner*—Morton Foelak
*Attorney, Agent, or Firm*—Townsend and Townsend

[57] ABSTRACT

Unsaturated polyester resin foams or cellular structures of varying low densities are prepared quickly at ambient temperatures from an admixture which comprises a liquid unsaturated curable polyester resin, an organic isocyanate compound, a suitable surfactant, an accelerator and a particular combination of peroxide curing agents, which also serves to initiate the release of gases that permit expansion of the resin in a controlled manner to obtain a foamed structure.

18 Claims, No Drawings

UNSATURATED POLYESTER RESIN FOAMS AND METHODS OF PREPARATION

BACKGROUND OF THE INVENTION

Unsaturated polyester foams have been prepared in the past by a number of different techniques. However, these processes have not been wholly successful or commercially feasible for various reasons. For example, a difficulty encountered in attempts to produce unsaturated polyester foams is to generate gases so as to cause a uniform expansion of the resin at ambient temperatures before any appreciable crosslinking occurs. The significant portion of the crosslinking and curing must ideally occur very soon after the maximum amount of gases has been released. Should appreciable crosslinking occur before maximum gas release, the accompanying exothermic reaction will cause cracking as the previously unreleased gases are further generated and cause stresses against a very rigid crosslinked structure which is unable to further expand. Should appreciable crosslinking not occur after maximum gas release has occurred, the gases will gradually escape and the expanded resin will gradually drop back to its original state. As a result, curing will occur much like a standard polyester resin casting or laminate with little or no expansion.

Some of the methods used in the past have utilized lower density additives such as polystyrene. However, these types of systems are limited in that they provide foams of only medium to high densities, i.e. ~25 lb/ft$^3$ (0.40 g/cc) or higher. The preparation of unsaturated polyester resin foams utilizing a hydrazide blowing agent in combination with peroxides is described in U.S. Pat. Nos. 3,920,589 and 3,920,590. Similar processes utilizing acid sensitive azo compounds are described in U.S. Pat. Nos. 4,009,157 and 4,029,615. Some of the limitations of such processes include the requirement of large percentages of accelerators, the use of either relatively high percentages of expensive azo blowing agents or the use of azo compounds of limited commerciability due to expense or difficulty of handling, i.e. azo compounds that require low temperature protection due to rapid room temperature decomposition and/or pose a hazard either directly or because of decomposition by-products.

Other publications describe the preparation of unsaturated polyester foams with the use of diisocyanates; see Chemical Abstracts Vol. 79, 116136j; Vol. 86, 141203f; Vol. 86, 172676s; Vol. 84, 91051r; and Vol. 86, 107410m. However, such processes require higher than ambient temperatures, long process times, limited density ranges, or high concentrations of the diisocyanates, amines, water, acids, carbonates and other accelerators which detract from the long term strength and stability of the cellular structure.

SUMMARY OF THE INVENTION

This invention relates to unique low density unsaturated polyester resin foams, liquid polyester resin foamable compositions for preparing such foams, and their preparation from readily available commercial materials. In particular, the liquid foamable polyester resin composition from which our polyester foams are prepared comprises: a liquid unsaturated polyester resin subject to cure; e.g., either to a flexible, semirigid or rigid resin; a peroxide-curing agent composed of hydrogen peroxide and an organic peroxide; a standard cobalt salt accelerator usually including a small amount of copper or manganese carboxylate salt for exotherm control; an organic isocyanate compound capable of reacting with the peroxide-curing agent to liberate gas to provide for the expansion of the liquid polyester resin; and a silicone surfactant for emulsifying and stabilizing the foam, the components being present in a critical weight ratio wherein a low-density polyester foam is provided by the liquid foamable composition.

Through this invention many practical and new applications for unsaturated polyesters can be realized. Rigid or semi-rigid structures thus formed from polyesters will be relatively inexpensive, have good strength, and be resistant to heat and many chemicals. They will also have good moisture resistance and light stability. As a result, among the many end uses will be applications requiring high strength, low weight composite material such as boats, panels of many types including structural materials, and in thermal, electrical and acoustical parts, lightweight building materials, automotive parts, and recreational components—all with insulating properties. In the fabrication of fiberglass reinforced boats, the foamed polyesters of this invention offer superior qualities over conventional materials because of their excellent adhesion to a like material, water resistance and excellent strength and stiffness. The number of possible applications is very high and the techniques, chemicals and processes necessary for preparation of these foams are well within the scope and experience off most of those skilled in this art.

The liquid unsaturated polyester resins useful in this invention are disclosed in some detail in U.S. Pat. No. 3,920,590, and such disclosure is incorporated herein. In particular, a broad class of linear or branched polyesters, typically prepared as a condensation or reaction product of an unsaturated polybasic acid and a polyhydric compound are useful; for example, the condensation product of an unsaturated dibasic acid of alpha-beta ethylenic unsaturation and a di- or trihydric compounds, such as a glycol. Often a saturated polybasic acid or anhydride, such as a dibasic acid, is employed with the unsaturated acid or anhydride to modify the reactivity of the unsaturated resin. The resin then is dissolved in a monomer having an unsaturated double bond which is copolymerizable with alpha, beta-unsaturated double bonds of the polyester resin. To such solutions are usually added a polymerization inhibiting agent or mixtures thereof.

Typical saturated polybasic acids are the dibasic acids including phthalic acids, iso- and terephthalic acids, adipic acid, succinic acid, sebacic acid and the like. Typical unsaturated dibasic acids are maleic acid, fumaric acid, citaconic acid, chloromaleic acid, allylsuccinic acid, itaconic acid, mesaconic acid, and others as well as their anhydrides. Examples of saturated or unsaturated polyalcohols are ethylene glycol, diethylene glycol, triethylene glycol, propylene glycol, dipropylene glycol, glycerol, 2-butyn-1,4 diol, neopentyl glycol, 1,2-propanediol, pentaerythritol, mannitol, 1,6 hexanediol, 1,3-butylene glycol, 2-buten-1,4 diol and the like. Fire retardant raw materials for polyester resins which may be used are tetrachloro phthalic anhydride, tetrabromo phthalic anhydride, dibromtetra hydrophthalic anhydride, chlorendic acid, tetrabromobisphenol A, and dibromo neopentyl glycol.

Typical unsaturated vinyl monomers or oligomers copolymerizable with the unsaturated polyester resins are styrene, vinyl toluene, methyl methacrylate, diallyl phthalate, t-butyl styrene, chlorostyrene (promotes fire retardancy), divinyl benzene, -methyl styrene, methyl acrylate, triallyl cyanurate, dibutyl fumarate, n-butyl methacrylate and others, as well as mixtures thereof. Typical inhibitors used in unsaturated polyester resin solutions are hydroquinone, p-benzoquinone, mono-t-butylhydroquinone, 2,5-diphenyl-p-benzoquinone, t-butyl-catechol, toluhydroquinone, toluquinone, hydroquinone monomethyl ether and others.

In addition, those skilled in this art will appreciate that other compounds can be used to inhibit free radical polymerization such as certain aromatic amines, quaternary ammonium chloride salts, amine salts, ascorbic acid, sulfur compounds and various mixtures of the above. Levels are usually in the 50 to 500 ppm concentrations and are utilized simply to impart good shelf life to the uncatalyzed resin solutions.

It has been found that a great number of conventional tertiary accelerators or promoters can be utilized in this invention, as disclosed in U.S. Pat. No. 3,920,590. Such tertiary accelerators, while not essential to the basic foam preparation are quite useful in shortening both the "cream time", gel time, and cure time of the systems. Such accelerators and promoters are known to provide more process flexibility in overcoming low ambient temperature conditions, and sluggish cures caused by high filler loadings and less reactive resins. Such accelerators have often been found to aid in reducing the foam density by insuring a more complete and compact reaction by causing maximum gas generation in a shorter time period.

Typical of such accelerators or promoters useful in this invention are the standard aromatic tertiary amines such as dimethyl aniline, diethyl aniline, phenyl ethyl ethanolamine, phenyldiethanolamine, dimethyl-p-toluidine, methyl phenyl ethanol amine, m-tolyl-diethanolamine. In addition, it has been found that a great number of other alkyl amines are useful including those having hydric functionality. Examples of useful compounds are triethylene-diamine, triethylamine, N-hydroxyethyl morpholine, trimethylamine, dimethylaminoethanol, (2-Dimethylamino-2-methyl-1-propanol) diethanolamine, triethanolamine, tetramethylbutanediamine.

Among the many catalysts that are available commercially to enhance reaction conditions are solutions and mixtures under a variety of tradenames such as "Dabco" catalysts (Air Products, Chemicals & Additives) and "Polycat" catalysts (Abbot Laboratories), "Niax" amine catalysts (Union Carbide) and "Thancat" amine catalysts (Jefferson Chemical Co.). In addition, other standard catalysts commonly used in polyurethane manufacture can be helpful in this invention such as the alkyl tin carboxylates, alkyltin mercaptides, organotin carboxylates, etc.

Accelerators useful in polyester compositions can also be employed in this invention. In particular, tertiary promoters such as beta-diketones and keto esters, i.e., 2,4 pentanedione, methyl acetoacetate, ethyl acetoacetate, 1-phenyl-1,3 butanedione, N,N-dimethyl acetacetamide, acetoacetanilide, acetoacet-o-toluidide, acetoacet-o-aniside, 5,5-dimethyl-1,3-cyclohexanedione, and the like have been found to be advantageous.

Also useful as typical secondary promoters are many of the common organic quaternary ammonium compounds such as trimethyl benzyl ammonium chloride, lauryl trimethyl ammonium chloride, triethyl phenyl ammonium chloride and the like.

The inclusion of compounds containing one or more isocyanate group, —NCO, has been found to be most advantageous. Poly functional isocyanates, containing two or three isocyanate groups, are particularly useful. For the purposes of this invention, most diisocyanates are suitable. However, it has been found that for optimum control of properties, the more ideal compounds are the prepolymers of common disocyanates. These isocyanate compounds have been particularly effective in the formulation when present in concentrations no greater than about 15% by weight.

Peroxides suitable for use in this invention include those that both activate the reaction leading to the release of gaseous by-products and also provide the free radicals to initiate the crosslinking and curing of the polyester resin system at ambient temperatures. The preferred peroxides are hydrogen peroxide solutions and solutions of certain methyl ethyl ketone formulations that are very high in monomeric oligomer. Other organic peroxides may also be substituted for the methyl ethyl ketone or employed as secondary or finishing catalysts.

Typical levels of the primary accelerator such as the various cobalt salts are about 0.001 to 0.20 parts per 100 parts of resin (phr), but more typically 0.01 to 0.10 phr based on actual metal content. The secondary promoters such as the copper or manganese salts or vanadium, lithium, iron carboxylates are included at lower levels such as 0.0001 to 0.01 phr based on metal content. The tertiary promoters, when utilized, are employed at the levels of 0.0001 to 1.00 phr depending on the particular compound.

The silicone surfactants found to be useful to the present invention to ensure entrapment and uniform dispersion of gaseous by-products include the silicone-oxyalkylene block copolymers that fall into two classes, depending upon the nature of the linking group between the organosiloxane and the oxyalkylene portion of the molecule. Thus, the silicone surfactants are characterized as hydrolyzable where the moieties are joined by a silicone-oxygen-carbon bond and non-hydrolyzable where the bond is silicon-carbon; see, for example, U.S. Pat. No. 3,779,774. Concentrations in the amount of about 1% by weight have been found satisfactory, with a practical useful range being about 0.5–1.5% by weight.

Silicone surfactants are available under a number of trade names known to those skilled in this art. Such materials have been specifically found to be applicable over a wide range of polyester formulations allowing uniform cell formation and maximum gas entrapment to achieve very low density foam structures. In contrast, silicone oils have been found to be unsatisfactory for attaining low density foams. Some of the silicone surfactants particularly useful for this invention are Union Carbide's L-520, L-532, L-550, L-5340, L-5350, L-5430, L-5710, L-5410 and L-5420; General Electric's SF-1066; and Dow Corning's 193, 195, 197, 190 and Q2-5098.

The isocyanates useful in this invention include many isocyanates and most of the diisocyanates and what are known as polymeric or prepolymeric isocyanates. The presence of the —N═C═O functionality is the principal requirement. For ease of handling, health and safety characteristics, as well as foam properties and processing characteristics, the polymeric organic polyisocyanates having sufficient —NCO content are especially suitable.

Some of the useful compounds are 2,4-toluene diisocyanate, mixtures of 2,4- and 2,6-toluene diisocyanate, (TDI), and the modified or prepolymer forms of these compounds. Also useful are diphenylmethane, 4,4'-diisocyanate (MDI), and polymethylene polyphenyl isocyanate (PMPPI). Others include octadecyl isocyanate, cyclohexyl isocyanate, dianisidine diisocyanate, metaphenylene diisocyanate, phenyl isocyanate, o-, m-, and p-chlorophenyl isocyanate, methylene bis (4-phenyl isocyanate, isophrone diisocyanate, trimethyl hexamethylene diisocyanate. These isocyanates, diisocyanates, and polymeric organic isocyanates are used in concentrations of at least about 5% by weight of resin, usually about 5 to 15% by weight of resin and preferably about 8 to 12% by weight of the resin.

Many of these are also available under a number of trade names such as Union Carbide's "NIAX" Isocyanates; Upjohn's "PAPI" and "Isonates"; and Witco Chemical's "Isofoams". In addition, commercial substances are available that combine polymeric isocyanates with silicone surfactants. Typical examples are Union Carbide's "NIAX SF-11", a prepolymer of modified TDI (toluene diisocyanate) containing about 2% of Union Carbide L-5340 silicone surfactant.

The peroxides preferred in combination with hydrogen peroxide are the ketone peroxides. Hydrogen peroxide is quite useful in initiating gas evolution but alone it often is too sluggish in developing the full cure and crosslinking of the unsaturated polyester resin. Combinations of hydrogen peroxide along with MEK Peroxides or other types of organic peroxides give rapid development of the foam along with a rapid development of the cure and desired physical properties of the cellular structure or part such as low density. Solutions of hydrogen peroxide and these methyl ethyl ketone peroxides yield an ideal catalyst (initiator) solution. Instead of the methyl ethyl ketone peroxides, a great number of other organic peroxides can serve as secondary peroxides for the purpose of accelerating the actual cure of the foam. Such diacyl peroxides as benzoyl peroxide are useful. Many of the peroxyesters are also useful such as t-butyl peroxy benzoate, t-butyl peroxy octoate, t-amyl peroxy octoate, 2,5-dimethyl, 2,5-diperoxyoctoate are examples of commercial products available for this purpose. Other suitable organic peroxides are peroxy dicarbonates, cumene hydroperoxide, t-butyl hydroperoxide, and 2,4-pentanedione peroxide.

Concentrations of total peroxide from about 1.0% to 3.0% (active basis) of the formulation have been found to be adequate. This total peroxide may have approximately equal parts by weight of organic peroxide and hydrogen peroxide with a useful range being about 2:1–1:2 parts by weight of organic peroxide to hydrogen peroxide.

EXAMPLE 1

A commercial, general purpose, orthophthalic, pre-promoted unsaturated polyester resin was used. The resin was manufactured by Cargill, Inc. and is described as a medium reactivity, thixotropic resin containing approximately 48% styrene monomer, and made from maleic acid, orthophthalic anhydride, and propylene glycol.

The resin is weighed into an 8-ounce polyethylene jar. The additives, surfactant and isocyanates are then weighed and mixed into the resin. Then the peroxide or peroxides are mixed into the solution for about 1 minute with rapid stirring. Some foaming is often observed in about 20 seconds. Maximum rise occurs usually within 10 to 20 minutes and foamed resin can normally be removed from the cup within 30 minutes, indicating a good firm rapid cure. After about 24 hours at room temperature densities are measured by the water displacement method. In this example two commercial isocyanates were utilized. NIAX ® Isocyanate SF-11 (by Union Carbide) is a prepolymer of modified TDI (toluene diisocyanate) that contains two percent Union Carbide[R] L-5340 silicone surfactant. The average free NCO content is 38.9%. Also used was Union Carbide's NIAX ® Isocyanate SF-58, an isocyanate mixture, containing no surfactant and having an average NCO content of 44.7%.

The various formulations and density measurements are shown in Table I. The peroxides used in this test were an aqueous 50% solution of Hydrogen Peroxide and a commercial water and glycol based solution of MEK Peroxide, FR-222, manufactured by U.S. Peroxygen Div., Witco Chemical Corporation. This product is high in the monomeric oligomer, 2,2-dihydroperoxy butane, consisting of over 75% of the MEK peroxide species present. The use of the combination of these two peroxides allows one to attain maximum gas evolution (lower densities) through the use of the hydrogen peroxide and rapid cure rates via the FR-222 or other peroxides. These foams are usually quite rigid within 45 minutes at ambient temperatures.

Table I

| No. | Resin grams | Isocyanate/grams | Surfactant/grams | Additive/grams | Peroxide(s)/grams | Densities g/cc(pcf)[1] |
|---|---|---|---|---|---|---|
| 1. | 50.0 | 0 | 0 | 0 | FR-222/1.4 | no foam |
| 2. | 45.0 | NIAX SF-58/5.0 | 0 | 0 | FR-222/1.4 | no foam |
| 3. | 45.0 | NIAX SF-58/5.0 | L-5340/0.60 | 0 | FR-222/1.4 | 0.51(31.7) |
| 4. | 45.0 | NIAX SF-58/5.0 | L-5340/0.60 | 0 | FR-222/0.40 $H_2O_2$-50/0.50 | 0.27(16.8) |
| 5. | 45.0 | NIAX SF-58/5.0 | L-5340/0.60 | Dimethyl Aceto-acetamide/0.40 | FR-222/0.40 $H_2O_2$-50/0.50 | 0.23(14.0) |
| 6. | 45.0 | NIAX SF-11/5.0[2] | 0 | 0 | FR-222/1.50 | 0.43(26.5) |
| 7. | 46.0 | NIAX SF-11/4.0 | 0 | 0 | FR-222/1.50 | 0.49(30.6) |
| 8. | 46.0 | NIAX SF-11/4.0 | 0 | 0 | FR-222/0.50 $H_2O_2$-50/0.50 | 0.28(17.2) |
| 9. | 46.0 | NIAX SF-11/4.0 | L-5340/0.40 | 0 | FR-222/0.50 $H_2O_2$-50/0.50 | 0.23(14.2) |
| 10. | 48.5 | NIAX SF-11/1.5 | L-5340/0.50 | Dimethyl Amino-ethanol/0.025 | FR-222/0.60 $H_2O_2$-50/0.60 | 0.47(29.3) |
| 11. | 46.5 | NIAX SF-11/3.5 | " | Dimethyl Amino-ethanol/0.025 | FR-222/0.60 $H_2O_2$-50/0.60 | 0.27(17.0) |
| 12. | 45.0 | NIAX SF-11/5.0 | " | Dimethyl Amino-ethanol/0.025 | FR-222/0.60 $H_2O_2$-50/0.60 | 0.18(11.5) |

Table I-continued

| Resin No. | grams | Isocyanate/grams | Surfactant/grams | Additive/grams | Peroxide(s)/grams | Densities g/cc(pcf)[1] |
|---|---|---|---|---|---|---|
| 13. | 42.5 | NIAX SF-11/7.5 | " | Dimethyl Amino-ethanol/0.025 | FR-222/0.60 H$_2$O$_2$-50/0.60 | 0.15(9.1) |

[1] pcf = pounds per cubic foot
[2] includes 2% L-5340

EXAMPLE 2

In this set of experiments another commercial general purpose orthophthalic based unsaturated polyester resin is used. This resin is GR-941 manufactured by Hatco Polyester Div. of W. R. Grace and Company and is an unpromoted grade made from maleic acid, orthophthalic anhydride and propylene glycol with styrene as the crosslinking monomer.

The resin was promoted with a combination of Cobalt octoate 12% and copper naphthenate 8%. The concentrations of these salts was 0.20 phr of the Cobalt solution and 0.015 phr of the Copper solution. In addition, 0.05 phr of Dimethylaminoethanol was used as a tertiary promoter to shorten the gel and cure times. Union Carbide's L-5340 at 1.0 phr was used as the surfactant. A number of different commercial isocyanate compounds were tested. Without the use of the surfactant very little or no foaming occurred. What gas evolution that did occur quickly dissipated. The peroxide system consisted of 1.33 phr FR-222 (MEK Peroxide solution and 1.33 phr of a 50% aqueous Hydrogen Peroxide Solution). The procedure was similar to that of Example 1, except only 45 g of resin were used in each experiment. See Table II for the results of this set of experiments.

Table II

| No. | Isocyanate (11 phr) | Type | Density g/cc (pcf) |
|---|---|---|---|
| 14. | NIAX® TDI | 80/20 mixture of Toluene 2,4 Diisocyanate + Toluene 2,6 Diisocyanate | 0.12 (7.4) |
| 15. | NIAX® SF-52 | TDI Prepolymer | 0.15 (9.2) |
| 16. | NIAX® SF-58 | Isocyanate mixture | 0.12 (7.2) |
| 17. | NIAX® SF-11 | Modified TDI Prepolymer | 0.16 (9.9) |
| 18. | Toluene 2,4 Diisocyanate | — | 0.12 (7.3) |
| 19. | Octadecyl Isocyanate | — | 0.68 (42.8) |
| 20. | Phenyl Isocyanate | — | 0.19 (12.1) |
| 21. | Isophorone Diisocyanate | — | 0.29 (18.3) |
| 22. | Polymethylene Polyphenyl Isocyanate | — | 0.11 (7.0) |
| 23. | PAPI® 135 | Polymethylene Polyphenylisocyanate Prepolymer | 0.11 (7.0) |
| 24. | PAPI® | Polymethylene Polyphenylisocyanate Prepolymer | 0.11 (6.9) |
| 25. | Isonate® 143L | Modified Diphenylmethane Diisocyanate | 0.21 (13.3) |
| 26. | Isonate® 226 | Modified Diphenylmethane Diisocyanate | 0.32 (19.9) |
| 27. | Isofoam® L-128 | TDI Prepolymer | 0.29 (18.0) |
| 28. | Isofoam® PE-2A | " | 0.14 (8.8) |
| 29. | Isofoam® R-0587A | Modified Diphenyl-methane Diisocyanate | 0.12 (7.6) |
| 30. | Isofoam® RR-0478A | Prepolymer of Diphenyl-methane Diisocyanate | 0.11 (7.0) |
| 31. | Isofoam® D-50-1-S | TDI Prepolymer | 0.25 (15.7) |
| 32. | Hylene® M-50 | 50% Methylene bis(4-phenyl Isocyanate | 0.36 (22.4) |
| 33. | Hylene® AP | 40% Modified MDI Polyisocyanate | 0.46 (28.5) |

Note:
NIAX® is a trademark of Union Carbide Corporation
PAPI® and Isonate® are trademarks of Upjohn Polymer Chemicals
Isofoam® is a trademark of Witco Chemical Corporation
Hylene® is a trademark of E.I. DuPont De Nemours & Company

EXAMPLE 3

Using the same procedures of Examples 1 and 2, a number of commercial unsaturated polyester resins were tested for their suitability to function within the scope of this invention and demonstrate the utility of the process.

The resins tested were Koppers 3000-25, manufactured by Koppers Plastics, which is described as a high reactivity, high hot strength resin, unpromoted, containing approximately 25% styrene monomer in which the ratio of maleic acid to phthalic anhydride is 2:1.

Also tested was Koppers 354-176 which is a low reactivity resin also for general purpose applications in which the ratio of maleic acid to phthalic anhydride is 1:2.

Two unpromoted resins from Synres Chemical Corporation were tested, Synolite 5907 and Synolite 372. Synolite 5907 is described as a medium reactivity, high strength, orthophthalate, laminating resin. Synolite 372 is described as a low reactivity, flexible, isophthalic based resin with good chemical resistance.

Also tested was a resin manufactured by PPG Industries, RS-50-2062, an orthophthalic based resin of medium to high reactivity used to make FRP panels.

Another isophthalic anhydride based resin was also tested from Koppers Plastics, 6000-25. This product is described as an unpromoted, high reactivity, high hot strength, moderate chemical resistant resin, containing approximately 25% styrene monomer.

The promoter system used in all the resins in this series was 0.20 phr of Cobalt Octoate 12%, 0.02 phr of Copper Naphthanate 8%, and 0.05 phr Dimethyl amino ethanol. The surfactant was Union Carbide's L-5340 at 0.50 phr, and the peroxide system was 1.2% by weight of 50% Hydrogen Peroxide and 1.2% by weight FR-222 (MEK Peroxide solution), except in the case of No. 41 in which 0.80% t-butyl peroxy benzoates was used in place of the FR-222. These peroxide concentrations are based on the weight of resin and isocyanate.

Table III lists the results of this series of experiments.

Table III

| No. | Resin/g. | Isocyanate/g. | Density g/cc (pcf) |
|---|---|---|---|
| 34. | Koppers 3000-25/45.0 | NIAX® TDI/5.0 | 0.11 (6.7) |
| 35. | " | NIAX® SF-11/5.0 | 0.10 (6.0) |
| 36. | Koppers 354-176/45.0 | NIAX® SF-11/5.0 | 0.13 (8.2) |
| 37. | Synolite® 5907/45.0 | NIAX® SF-11/5.0 | 0.13 (8.1) |

Table III-continued

| No. | Resin/g. | Isocyanate/g. | Density g/cc (pcf) |
|---|---|---|---|
| 38. | Synolite® 372/45.0 | NIAX® SF-11/5.0 | 0.22 (14.0) |
| 39. | PPG RS-50-2062/45.0 | NIAX® SF-11/5.0 | 0.15 (9.2) |
| 40. | PPG RS-50-2062/47.5 | NIAX® SF-11/2.5 | 0.20 (12.6) |
| 41. | PPG RS-50-2062/45.0 | NIAX® SF-11/5.0 | 0.25 (15.3) |
| 42. | Koppers 6000-25/45.0 | NIAX® SF-11/5.0 | 0.12 (7.5) |

EXAMPLE 4

A high reactivity, isophthalic anhydride based, commercial unsaturated polyester resin, Koppers 6000-25, was used in this series. A commercial grade of a modified prepolymer of polymethylene polyphenylisocyanate was used. The product was Upjohn Polymer Chemicals' PAPI® 135, described as medium viscosity, high reactivity grade having an NCO content of 31.5% by weight. The basic formulation consisted of 45.0 g of the resin having been promoted with 0.20 phr cobalt octoate 12%, 0.02 phr copper naphthenate 8%, and 0.05 phr dimethylaminoethanol. To this was added 5.0 g of the PAPI 135 and the various surfactants. As in examples 1 to 3, the peroxides were added last. In this series the peroxides were 0.60 g FR-222 MEK Peroxide and 0.60 g Hydrogen Peroxide-50% aqueous solution. As in the previous experiments maximum rise usually occurred in about 15 to 20 minutes and foam integrity developed so that within 45 minutes it could be removed from the polyethylene jar.

The results are listed in Table IV.

Table IV

| No. | Resin Grams | Isocyanate/g. | Surfactant/g. | Density g/cc (pcf) |
|---|---|---|---|---|
| 43. | 45.0 | PAPI 135®/5.0 | none | no foam |
| 44. | 45.0 | " | General Electric Silicone Fluid SF-1093/0.3 | 0.45 (28.2) |
| 45. | 45.0 | " | General Electric Silicone Surfactant SF-1066/0.3 | 0.18 (11.3) |
| 46. | 45.0 | " | Union Carbide L-5340 Silicone Surfactant/0.3 | 0.12 (7.6) |
| 47. | 45.0 | " | Dow Corning 193 Silicone Surfactant/0.3 | 0.13 (8.1) |
| 48. | 45.0 | " | Dow Corning Silicone Fluid 200/0.3 | 0.49 (30.4) |
| 49. | 45.0 | " | Dow Corning 197 Silicone Surfactant/0.3 | 0.12 (7.8) |
| 50. | 45.0 | " | Union Carbide L-5420 Silicone Surfactant/0.3 | 0.14 (8.8) |
| 51. | 45.0 | " | Union Carbide L-550 Silicone Surfactant/0.3 | 0.13 (8.1) |
| 52. | 45.0 | " | Union Carbide L-532 Silicone Surfactant/0.30 | 0.25 (15.8) |
| 53. | 45.0 | Union Carbide | 0.13 (8.1) L-520 Silicone Surfactant/0.30 | |

It will be appreciated by those skilled in this art that many additional materials that are commonly used in the fabrication of unsaturated polyester parts such as reinforcements (fiberglass, etc.), fillers of many types (Calcium carbonate, talc, etc.), dyes and pigments, can all be incorporated into the foams of this invention, the purpose and effect of these additives being merely to modify certain properties such as appearance, strength, cost, weight, etc.

What is claimed is:

1. A liquid unsaturated polyester resin composition adapted to expand and cure into a foam product having a density below about 25 pounds per cubic foot, comprising:
   (a) a promoted liquid unsaturated polyester resin adapted to be crosslinked by a curing and foaming agent;
   (b) a curing and foaming agent activated at ambient temperatures to effect crosslinking and curing of said polyester resin, said agent consisting essentially of similar quantities of hydrogen peroxide, an organic peroxide and an organic isocyanate present in an amount in the range of about 5% to 18% of the weight of polyester resin; and
   (c) a silicone-oxyalkylene block polymer.

2. A liquid unsaturated polyester resin composition in accordance with claim 1 wherein said polyester resin is in solution with a vinyl monomer.

3. A liquid unsaturated polyester resin composition in accordance with claim 1 wherein the organic peroxide is methyl ethyl ketone peroxide.

4. A liquid unsaturated polyester resin composition in accordance with claim 1 wherein said peroxide-curing and foaming agent is about 1.0-3.0% by weight of said composition.

5. A liquid unsaturated polyester resin composition in accordance with claim 4 wherein said hydrogen peroxide and organic peroxide are in approximately equal parts by weight relative to each other.

6. A liquid unsaturated polyester resin composition in accordance with claim 4 wherein said organic peroxide and hydrogen peroxide are in a weight ratio of about 2:1 to 1:2.

7. A liquid unsaturated polyester resin composition in accordance with claim 1 wherein said silicone-oxyalkylene block polymer is about 0.5-1.5% by weight of said composition.

8. A liquid unsaturated polyester resin composition in accordance with claim 1 wherein said organic isocyanate is about 5-15% by weight of said polyester resin.

9. A liquid unsaturated polyester resin composition in accordance with claim 8 wherein said organic isocyanate is about 8-12% by weight of said polyester resin.

10. A method for making a foam product having a density below about 25 pounds per cubic foot comprising mixing together at ambient temperature;
   (a) a promoted unsaturated polyester resin adapted to be crosslinked by a curing and foaming agent;
   (b) a curing and foaming agent activated at ambient temperatures consisting essentially of similar quantities of hydrogen peroxide, an organic peroxide and an organic isocyanate present in an amount in the range of about 5% to 18% of the weight of said polyester resin; and
   (c) a silicone-oxyalkylene block polymer;
allowing said mixture to be expanded, crosslinked and cured by said curing and foaming agent.

11. A method for making a foam product in accordance with claim 10 wherein said polyester resin is in solution with a vinyl monomer.

12. A method for making a foam product in accordance with claim 10 wherein the organic peroxide is methyl ether ketone peroxide.

13. A method for making a foam product in accordance with claim 10 wherein said peroxide-curing agent is about 1.0–3.0% by weight of said composition.

14. A method for making a foam product in accordance with claim 13 wherein said hydrogen peroxide and organic peroxide are in approximately equal parts by weight relative to each other.

15. A method for making a foam product in accordance with claim 13 wherein said organic peroxide and hydrogen peroxide are in a weight ratio of about 2:1 to 1:2.

16. A method for making a foam product in accordance with claim 10 wherein said silicone-oxyalkylene block polymer is about 0.5–1.5% by weight of said composition.

17. A method for making a foam product in accordance with claim 10 wherein said organic isocyanate is about 5–15% by weight of said polyester resin.

18. A method for making a foam product in accordance with claim 17 wherein said organic isocyanate is present in an amount of about 8–12% by weight of said polyester resin.

* * * * *